United States Patent
Goodfellow et al.

(10) Patent No.: US 7,023,672 B2
(45) Date of Patent: Apr. 4, 2006

(54) DIGITALLY CONTROLLED VOLTAGE REGULATOR

(75) Inventors: John Ryan Goodfellow, Mesa, AZ (US); Robert T. Carroll, Andover, MA (US); Malay Trivedi, Chandler, AZ (US); Erik McShane, Phoenix, AZ (US); Kevin Mori, Chandler, AZ (US)

(73) Assignee: Primarion, Inc., Phoenix, AZ (US)

( * ) Notice: Subject to any disclaimer, the term of this patent is extended or adjusted under 35 U.S.C. 154(b) by 406 days.

(21) Appl. No.: 10/358,066

(22) Filed: Feb. 3, 2003

(65) Prior Publication Data

US 2004/0150928 A1   Aug. 5, 2004

(51) Int. Cl.
*H02H 3/22* (2006.01)

(52) U.S. Cl. .................................. 361/18; 361/111
(58) Field of Classification Search .................. 361/18, 361/91.1–91.3, 90, 92, 110, 111, 93.1; 323/272, 323/282, 283, 284
See application file for complete search history.

(56) References Cited

U.S. PATENT DOCUMENTS

| | | | | |
|---|---|---|---|---|
| 5,325,043 A | * | 6/1994 | Parro | 322/23 |
| 6,198,261 B1 | * | 3/2001 | Schultz et al. | 323/272 |
| 6,456,045 B1 | * | 9/2002 | Troy et al. | 320/139 |
| 6,791,304 B1 | * | 9/2004 | Pearce et al. | 323/283 |
| 6,809,678 B1 | * | 10/2004 | Vera et al. | 341/166 |
| 2003/0011247 A1 | * | 1/2003 | Kajiwara et al. | 307/125 |

* cited by examiner

Primary Examiner—Brian Sircus
Assistant Examiner—Danny Nguyen
(74) Attorney, Agent, or Firm—Theodore E. Galanthay

(57) ABSTRACT

Disclosed is a digitally controlled multi-phase voltage regulator system providing regulated power to electronic components that have variable power requirements. Power is supplied by one or more power integrated circuits (IC) each having a high side power switch controlled by pulse width modulated signals and a low side power switch. The power IC senses voltage at the load and has an on-chip current mirror for generating a current that is a ratio of current delivered to the load. The power IC also has current limiting and on-chip temperature sensing components. The voltage and current information is digitized and provided to a control integrated circuit (IC). The control IC receives this digitized information as well as user provided parameters and, in the regulation mode of operation, provides digitized pulse width modulated control signals to the power IC. In an active transient response mode of operation, the control IC provides signals to turn either the high side switches or low side switches ON. Fault detection circuitry identifies over voltage, under voltage, and excessive temperatures. All communications between the control IC and the power IC are digital providing high bandwidth, optimal control frequency response, noise immunity and efficient active transient response.

23 Claims, 7 Drawing Sheets

DIGITALLY CONTROLLED VOLTAGE REGULATOR

CROSS-REFERENCES TO RELATED PATENT APPLICATIONS

1. U.S. patent application Ser. No. 10/237,903, filed on Sep. 9, 2002, by Trivedi et al, entitled: SYSTEM & METHOD FOR CURRENT HANDLING IN A DIGITALLY-CONTROLLED POWER CONVERTER.
2. U.S. patent application Ser. No. is pending; filed on Nov. 12, 2002, by Duffy et al, entitled: "METHODS AND APPARATUS FOR REDUCING PARASITIC INDUCTANCE USING INTER-DIGITATED BOND WIRES",
3. U.S. patent application Ser. No. 9/978,296, filed on Oct. 15, 2001, by Goodfellow et al, entitled: "SYSTEM AND METHOD FOR CURRENT SENSING".

BACKGROUND OF THE INVENTION

1. Technical Field

The present invention relates generally, to voltage regulators and, more particularly, to a digitally controlled multi-phase voltage regulator system to provide power to electronic components, such as microprocessors and the like.

2. Background Information

Electronic components, such as microprocessors require fast, intelligent power systems, typically referred to as voltage regulators (VRs). Voltage delivery must be accurate, precise, and able to respond rapidly to variable current loads.

As electronic components become increasingly powerful, fast and complex, such devices require increasingly capable power supplies. Many devices such as microprocessors, microcontrollers and the like now demand that relatively high current levels be provided extremely efficiently and with very low fluctuations in current and voltage. Microprocessors such as those available from the Intel Corp. and Motorola Inc., for example, can demand a continuous supply of current in excess of 100 amperes at voltage levels below 2 volts.

Conventional power supplies for use in microprocessor systems typically include switched-mode power supplies such as voltage regulator modules (VRMs) or the like operating in a voltage-controlled mode. Each VRM typically controls a voltage across the output load using conventional feedback and compensation circuitry. In such embodiments, the voltage across the load is sensed and compared against a reference signal in the feedback path. The compensation circuitry then controls a gating signal that determines the output voltage as appropriate to provide electrical power to the load component.

To implement such a power supply, a conventional VRM is frequently configured as a conventional step-down buck power converter. A DC load line is often specified for microprocessor loads such that the output load voltage decreases with increasing load current. The scheme of dynamically adjusting the output voltage with load current is commonly referred to as active voltage positioning (AVP). Conventional single-stage buck converters, however, typically do not provide adequate power for many applications due to thermal constraints and efficiency requirements. To overcome this problem, the power supply modules are typically configured as multi-phase converters such that several phase-separated buck channels operate in parallel within the VRM so that load current is appropriately distributed between the various stages. The multiple channels allow for multiphase switching within the power stage to reduce thermal stress, to reduce output ripple voltage and to improve the ability to finely control the electrical output characteristics of the module.

Voltage regulation is achieved by sensing the output voltage via a feedback control loop, which modulates the "ON" time of the high-side switch (PWM) to control the regulated output voltage. Dynamic microprocessor current requirements are roughly 250 A/uSec, resulting in substantial "droop" and "overshoot" of the regulated output voltage. The slew limitations of the power stage, due to the output filter inductance, must be supplemented by microprocessor decoupling capacitors. Due to size and cost restraints, it is not desirable to utilize large quantities of high quality capacitors.

To provide tight voltage regulation and to minimize thermal overstress, it is frequently desired to evenly balance the current provided between the individual channels of the VRM, as well as the current provided between parallel-connected VRMs. To balance the currents provided by the multiple modules and channels, accurate information about the currents provided within the system may be required. Some exemplary current sensing schemes include: (i) measuring voltage across a sense resistor placed in series with the input voltage, (ii) measuring voltage across a high or low-side FET in a buck stage, (iii) measuring voltage across an output inductor, and (iv) using a current sense loop.

Such conventional systems typically implement the VR in either analog components or with a combination of analog and digital components. VR's that implement the control and signaling with a combination of analog and digital components usually perform control digitally and signaling in the analog domain. This combination requires replacement of analog components for performance optimization. Moreover, the use of analog signaling is inferior since it is more susceptible to differential noise pickup which may degrade signal accuracy or precision.

Improved voltage regulator systems and circuits are therefore needed to provide electronic components, such as microprocessors and microcontrollers with a clean supply voltage at high current levels. The ability to maintain supply voltages within a tightly regulated window with rapid variations in current demand is key because of performance and reliability requirements. Conventional voltage regulators are reaching their limits in providing the dual requirements of high current and low voltage.

BRIEF SUMMARY OF THE INVENTION

The system and circuit in accordance with the present invention overcome the failings of the prior art by providing a digitally controlled voltage regulator that delivers clean power to electronic components such as microprocessors, microcontrollers and the like.

In accordance with one embodiment of the present invention, a power integrated circuit (power IC) and a digital control integrated circuit (control IC) are used to implement a highly programmable digitally controlled multi-phase voltage regulator. A plurality of power integrated circuits provide regulated power to a load having rapidly varying power requirements, such as a microprocessor. At least one of the plurality of power integrated circuits accurately senses voltages at the microprocessor, by means of a Kelvin connection, and sends digitized signals to a control integrated circuit. The control IC can be easily tailored to provide specified power requirements to a load as it has a programmable storage device for storing information such as user provided parameters. The programmability includes information on how to interpret microprocessor manufacturer provided information regarding the output voltage to be delivered to the microprocessor. The control IC processes the sensed digitized signals and the stored parameters and provides digital control signals to the power integrated circuits, thereby regulating the power provided to the microprocessor. Since all communications between the power IC and control IC are digital, power control is very precise and susceptibility to noise is substantially reduced.

In accordance with the embodiment of the present invention, each power integrated circuit has integrated on a semiconductor chip, a high-side power switch, typically a power field effect transistor such as a pFET of a buck converter. The power provided to the load is adjusted by a pulse width modulated signal provided to the high-side power switch by a gate driver. A second gate driver controls a low-side power switch, typically an nFET. In most applications the nFET is not integrated on the same semiconductor substrate with the power IC.

In accordance with one aspect of the invention, peak channel currents are scaled and digitized in the power IC and are provided to the control IC. In accordance with another aspect of the invention, an analog to digital converter digitizes the difference between a programmable reference voltage and the regulated output voltage. The control IC utilizes this information to modulate and control the high side and low side power switches in all of the power IC's, providing a precisely controlled output voltage load line including current balancing between phases.

In accordance with a still further aspect of the invention, an active transient response mode prevents output voltage excursions beyond a programmable threshold window.

In accordance with yet another aspect of the invention, thermal and overload shutdown are provided. In particular thermal sensing is integrated into the same semiconductor substrate with the power IC for highly accurate temperature sensing.

BRIEF DESCRIPTION OF THE SEVERAL VIEWS OF THE DRAWINGS

The subject invention will hereinafter be described in conjunction with the appended drawing figures, which are provided for purposes of illustration and not limitation, wherein like numerals denote like elements, and.

DESCRIPTION OF EXEMPLARY EMBODIMENTS

Figure 1A:
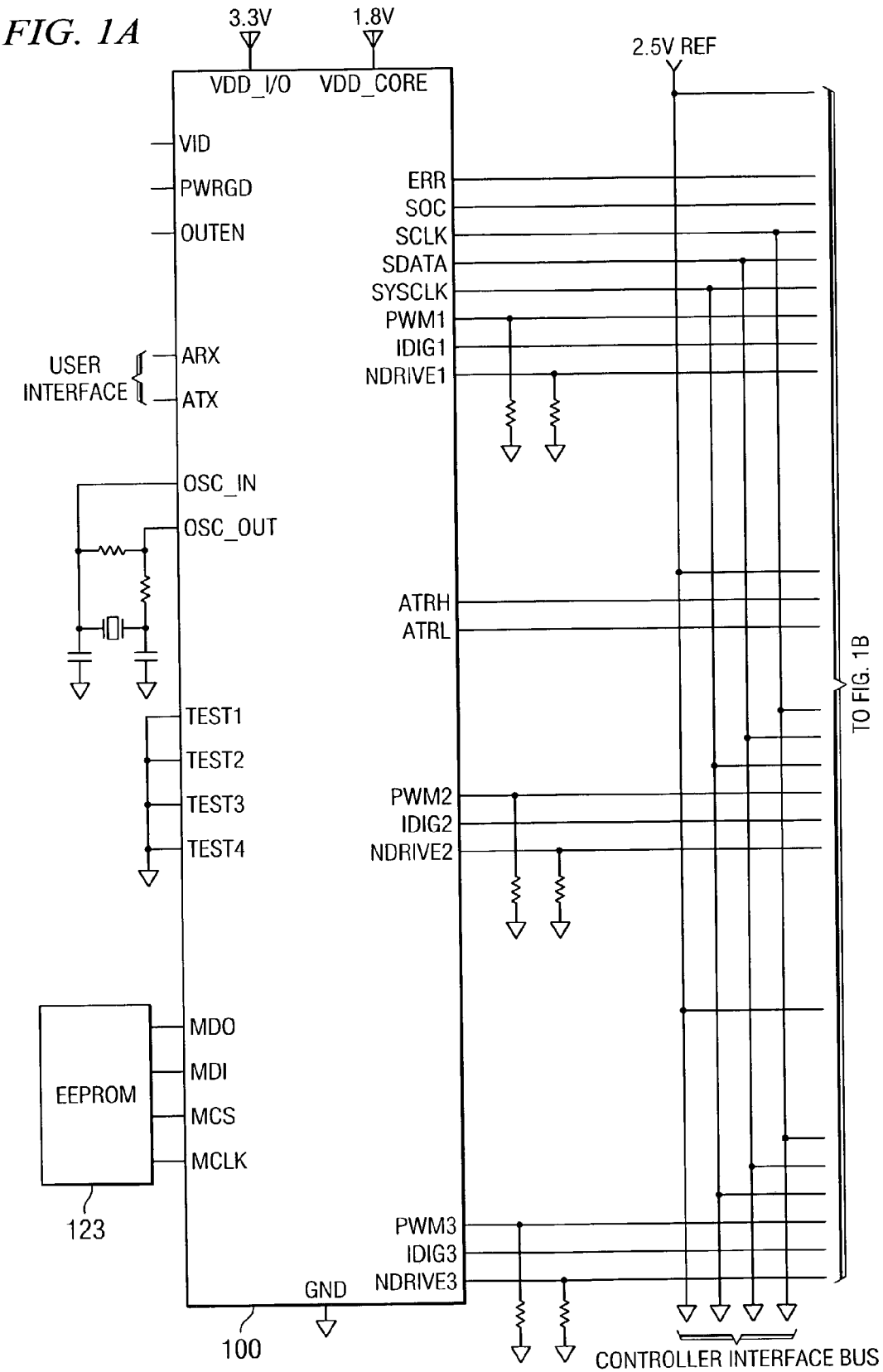
FIGS. 1A and 1B are a schematic diagram illustrating the voltage regulator of the present invention.
Figure 1B:
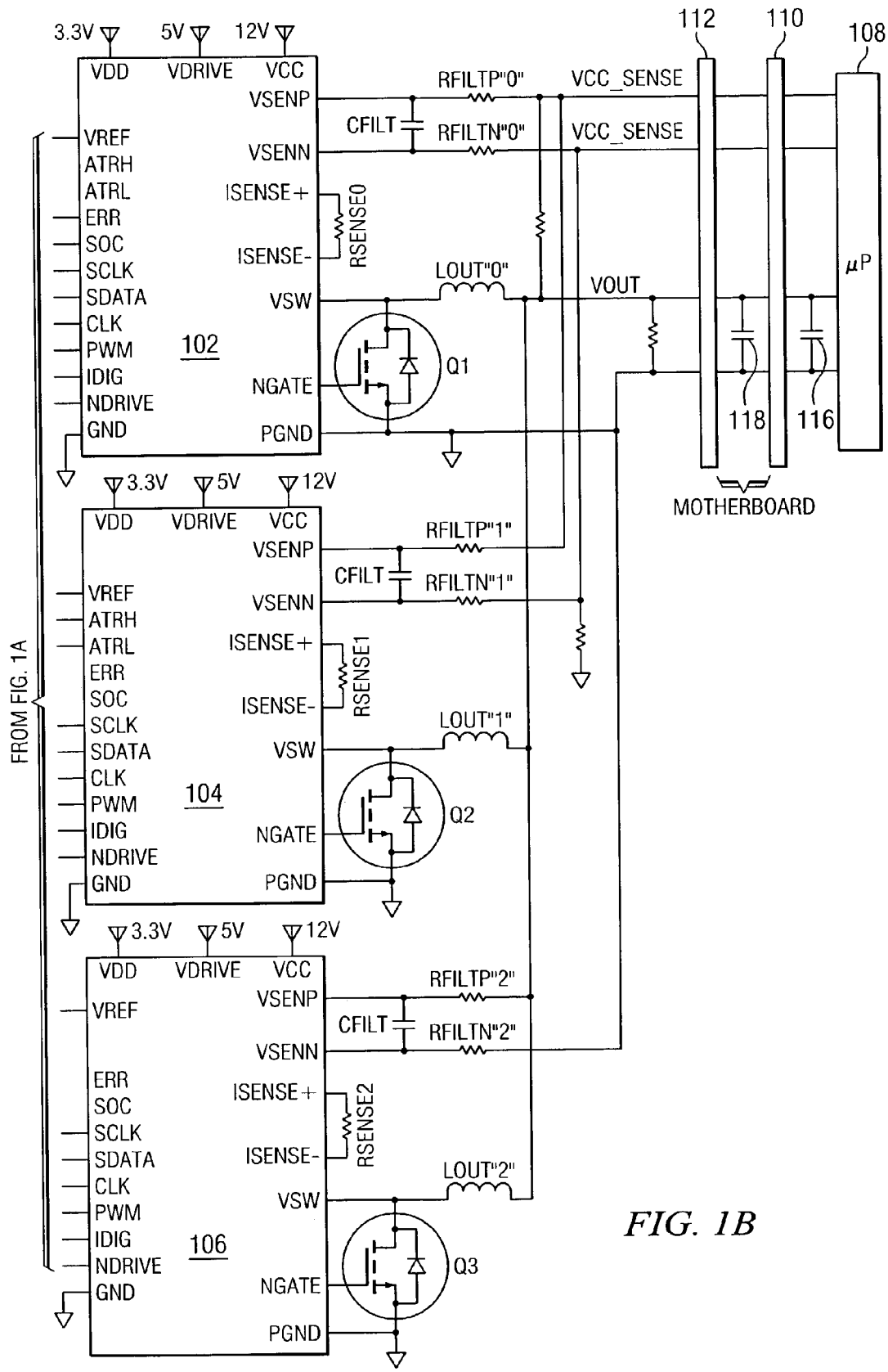

In accordance with the exemplary embodiment of the invention, a voltage regulator implemented in a multi-chip system that utilizes digital control to deliver clean power to microprocessor loads is shown in FIGS. 1A and 1B (collectively FIG. 1). The digital controlled voltage regulator comprises a single digital control IC 100 coupled to a plurality of power IC's 102, 104, and 106. Although the illustrated example shows three power IC channels, the illustrated system utilizes six channels. The illustrated Controller Interface Bus connects to three additional power IC's similar to 102, 104 and 106 and not specifically shown in the drawing figure to simplify the description. Those skilled in the art will recognize that the number of channels is a matter of design choice and any number of channels could be utilized. The power IC's 102, 104, and 106 are connected in parallel and provide multiple phases of load current to the processor 108 with a precisely controlled output voltage. The system is configured as a multi-phase synchronous buck regulator.

Although each of the power IC's contains the same circuitry, the connections to selected inputs and outputs define different functions for each of the illustrated channels. Thus, power IC 102 provides a Regulation Mode Channel. It receives VCC_Sense and VSS_Sense signals (the high and low voltages measured by a Kelvin connection to the microprocessor 108) through the filter formed by the illustrated resistors and capacitor: RFILTP "0", RFILTN "0", and CFILT "0", etc. Power IC 102 is the only channel that then provides a digitized error signal ERR with strobe clock SOC to the control IC 100. Power IC 104 is the only channel that provides an Active Transient Response Mode Channel. It also receives the VCC_Sense and VSS_Sense Signals, at terminals VSENP and VSENN. It provides the active transient response high (ATRH) and active response low (ATRL) digitized signals to the control IC 100. Power IC 106 provides the Under Voltage/Over Voltage (UV/OV) Mode Channel. It is connected to VOUT, thereby sensing the switched voltage (as it exists at the socket 112), at its input terminals VSENP and VSENN and provides a UV/OV signal to the control IC via the SDATA line.

The three additional power ICs together with power ICs 102, 104, and 106 provide a total of six channels to smooth out the supplied multi-phase power with six phases. The three additional power ICs are not required to perform any control functions already performed by the other power ICs, i.e. Regulation Mode (power IC 102), Active Transient Response Mode (power IC 104) and UV/OV Mode (power IC 106). Accordingly the three additional power ICs do not receive the VSENP and VSENN inputs. Also, the three additional power IC's do not have connections to either the control IC 100 or the Controller Interface Bus for: ATRH, ATRL, ERR, or SOC.

Each power IC contains a high side power switch, such as a power PFET that serves as the high-side switch in a buck converter stage. The low-side NFETs Q1, Q2 and Q3 and the filter inductors Lout0, Lout1, and Lout2 are implemented externally. In addition to the PFET, the power IC also contains gate drive circuitry for the high-side and the low-side FETs. The gating signals PWM and NDRIVE for the high-side and low-side FETs, respectively are provided by the control IC 100. The control IC 100 maintains the phase relationship between the parallel connected power IC's 102, 104, and 106 as well as the additional parallel connected power ICs (not shown) connected to the control IC and Controller Interface Bus as previously described, and insures output voltage regulation with the varying load normally associated with electronic components such as microprocessor 108. Microprocessor 108 is typically plugged into a processor socket 110; which is on the same motherboard and in close proximity to the VRM socket(s) 112, into which power ICs 102, 104, and 106, etc. are plugged. The power ICs can be housed in a multi-chip module with the control IC 100, in separate modules or, as large-scale integration of components continues, all the components in FIG. 1 could be formed on a single substrate.

The control IC 100 has a compensation network (described in greater detail in FIG. 6) that manipulates the digital voltage error ERR and load current information IDIG to maintain regulation. The power IC's 102, 104, and 106 contain data converters that translate the sensed output voltage and channel current information to the digital equivalent. The compensation network can be digitally programmed to implement a feedback path with up to two zeros and three poles, which covers a majority of the commonly used compensation networks in power converters. The digital current information IDIG is used to accomplish output voltage adjustment with changing load, current balancing between phases and system shutdown in the event of overload conditions. The control IC 100 also has a state control that performs overall system check and controlled output voltage ramp at the time of start-up, regulates normal mode, i.e. regulation mode operation, and implements fault protection in the event of abnormal operation. (The operation of the state control is described in connection with FIG. 7.) A programmable storage device on the control IC (or connected to the control IC 100, as for example an EEPROM 123), enables a highly programmable system implementation. The power IC's 102, 104, and 106 have sensors that indicate a range of fault conditions including input under-voltage, output under-voltage, output over-voltage, output current overload and thermal overstress. In the event of a rapid load transient, the output voltage tends to droop or spike because of the latency of the compensation network and circuit parasitics. A window comparator (illustrated in greater detail in FIG. 5) on the power IC 104, for example detects such wide excursions of the output voltage from the set point and sends a flag to the control IC 100. The control IC 100 then initiates an active transient response mode during which all phases in the multi-phase converter are aligned in phase to rapidly bring the output voltage within a regulation window. The control IC 100 also effects a smooth transition between such hysteretic operation and the normal closed loop operation of the system. Those skilled in the art will recognize that the various described functions such as the window comparator, temperature and over/under voltage protection, can be formed in either the control IC 100, or power ICs 102, 104, or 106, as desired. However, functions such as temperature sensing are preferably performed in the power IC's on the same semiconductor substrate as the high side PFET. Those skilled in the art will also recognize that some of the functions described herein can be implemented in software as well as hardware and, with respect to the hardware, a variety of semiconductor technologies and packaging technologies can be utilized. A particularly advantageous packaging technique is described in the co pending Duffy et al patent application cross referenced hereinabove.

Figure 2:
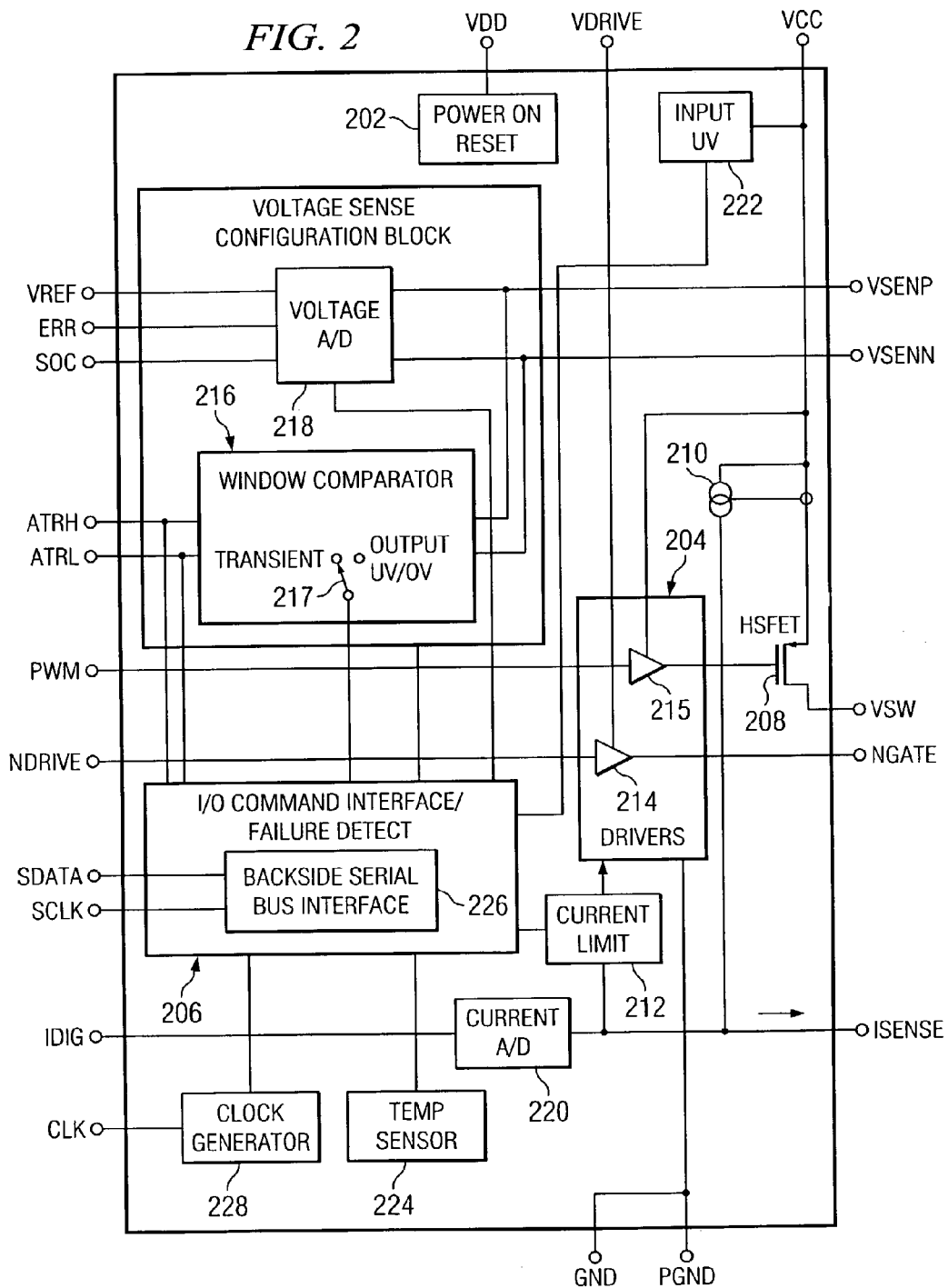
FIG. 2 is a schematic diagram illustrating the power IC of the present invention.

Refer now to FIG. 2, which illustrates a power IC, in accordance with the present invention. The illustrated power IC can be any one of power ICs 102, 104, or 106, as shown in FIG. 1, as well as additional power IC's similarly connected to the Controller Interface Bus. Each power IC includes a high side power switch, i.e. PFET 208 and drivers 204. Driver 215 provides pulse width modulated signals to PFET 208 and driver 214 provides a drive signal to the gate of the off-chip NFET (e.g. Q1, Q2, and Q3 in FIG. 1). The power IC also includes programmable analog fault detection 206 and sensor circuitry formed onto a single integrated circuit chip. The power IC circuitry further includes: Lossless integrated current sense 210 and programmable peak current limit comparator 212.

Also formed in the power IC are: programmable window comparator 216, configured to engage active transient response mode of operation (as illustrated by the position of switch 217) or output under/over voltage protection (when switched to the OUTPUT UV/OV position). In the active transient response mode, high and low active response signals are sent to the control IC via ATRH and ATRL, respectively by power IC 104. In the UV/OV mode, signals indicating under or over voltage are sent by the widow comparator 216 to Backside Serial Bus Interface 226 and on to the control IC via the SDATA line by power IC 106.

Also provided on the power IC are: voltage A/D converter 218 configured for output voltage sensing, current A/D converter 220 configured to sense peak current in high side PFET 208, input under voltage lockout 222, programmable thermal shutdown responsive to temperature sensor 224, and serial bus 226 configured for programming and system monitoring. Also provided is clock generator 228.

The integrated power stage with system monitoring is packaged in a QFN for enhanced system performance. The details of the package are contained in the Duffy et al copending patent application entitled: "METHODS AND APPARATUS FOR REDUCING PARASITIC INDUCTANCE USING INTER-DIGITATED BOND WIRES", as cross-referenced herein above. More particularly, in power integrated circuits (ICs) such as voltage regulators and the like, parasitic effects can be performance-limiting factors. During turn-off of a switching device, leakage currents flow in the parasitic loop formed by the capacitance of the switching device with the bulk capacitors at the input. The package parasitic inductance in this loop sets up an oscillation, causing ringing-voltage across the switching device. The overshoot amplitude of the ringing voltage is directly proportional to the total package parasitic inductance of the loop and the current turn-off rate. If the loop inductance is sufficiently high, the overshoot amplitude may reach dangerously high levels and permanently damage the switching device itself.

Moreover, as package parasitics increase, device efficiency decreases. This drives higher power dissipation in the device, forcing it to operate at higher temperatures and leading to early device failure. Therefore, there is a need in the microelectronic component art to achieve a low parasitic package (as described in the Duffy et al copending patent application) to improve device efficiency.

With continued reference to FIG. 2, as well as FIG. 1, the high side FETs 208 and low side FETs Q1–Q3, alternately couple the output inductors (Lout0, Lout1 and Lout2) to the high voltage rail 114 and ground, respectively. In the module package of the type referenced hereinabove, the high side FET 208 drain and source are nets Vsw and Vcc, respectively. Skilled artisans will recognize that although a pFET is preferred an nFET may also be used for the high side FET and/or a pFET may be used for the low side FET. In the current example, the FETs are power MOSFETs. The low side FETs Q1–Q3 drain and source connect to Vsw and ground, respectively. This activity generates a square wave at Vsw, which is rectified by the output filter (including inductors Lout, microprocessor 108 decoupling capacitors 116 and 118). Each channel is appropriately phased in time as to minimize output ripple voltage. The regulated output voltage is determined by the duty cycle (D) of the high side switch 208, where: Vout=D*Vin.

The power IC's 102, 104, and 106 utilize feedback control, where the output voltage is monitored and pulse width modulation (PWM) techniques maintain tight regulation of the output voltage. As the load increases, the duty cycle is increased in response to the dynamic load. The A/D converter 218 is configured to monitor the voltage supplied to the electronic load 108. The data generated provides digital feedback for closed loop DC regulation. Transient response of the system is improved by monitoring the regulated output voltage with a programmable window comparator 216. If the output voltage "droops" below the lower programmable trip point on the window comparator, the window comparator issues a signal to the digital controller 100 to simultaneously turn all of the high-side switches 208 "ON". Synchronized response of a multiphase converter improves the transient response capability of the system by paralleling the output inductors Lout0, Lout1 and Lout2, which increases the di/dt capability of the power ICs 102, 104, and 106, etc. The upper programmable window comparator trip point initiates the previously stated response with all low-side switches by turning all the NDRIVE signals "ON".

A fraction of the peak current in PFET 208 is mirrored to a resistor ($r_{sense}$) e.g. rsense0, rsense1 and rsense 2 associated with each of power IC's 102, 104, and 106, respectively, generating a voltage representation of the scaled high side current. This current sensed through current mirror 210 can be, for example, 1/5900 of the current output of high side FET 208. The current mirror circuitry is formed on the same semiconductor substrate and by the same process as PFET 208. This assures automatic tracking of the current ratio that might otherwise be adversely affected by process and temperature variations. A suitable technique for current sensing is described in the cross-referenced Goodfellow et al patent application; which is hereby incorporated by reference.

Figure 4:
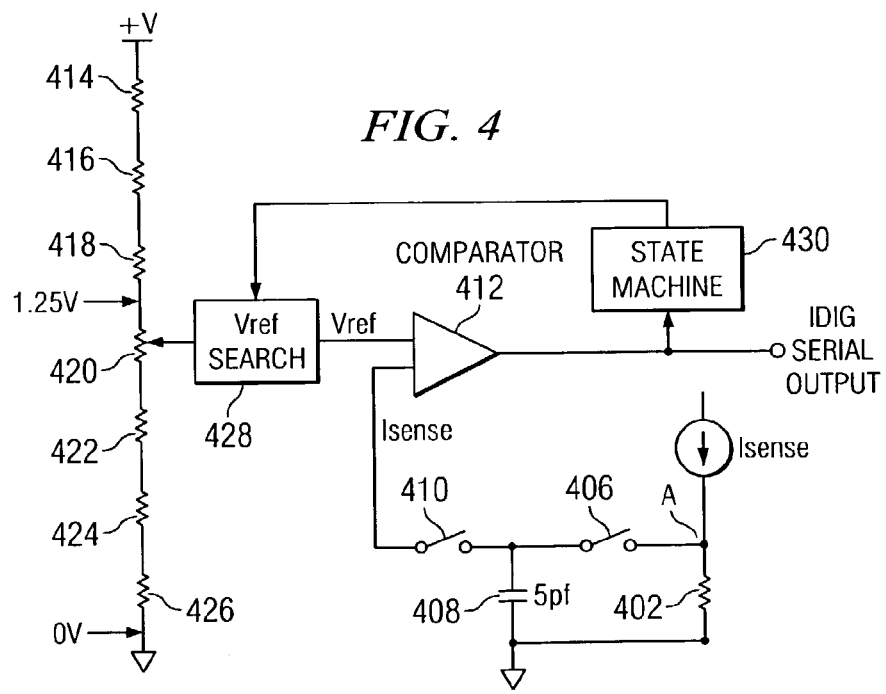
FIG. 4 is a schematic diagram illustrating a current analog to digital (A/D) converter in accordance with another aspect of the present invention.

The peak voltage across $r_{sense}$ is sampled by current A/D converter 220. Accurate current information IDIG is supplied to the control IC 100 via the current A/D converter 220. Current information IDIG is used by the control IC 100 to balance channel current and enable active voltage positioning. A suitable comparator, as described in greater detail showing comparator 412 in FIG. 4, is configured such that the inverting input is tied to a programmable voltage reference VREF and the non-inverting input detects the voltage generated across the $r_{sense}$ resistor 402 to provide pulse-by-pulse peak current limit. The output of the current limit comparator 212 feeds into the driver logic 204, causing the high side FET 208 to turn off and the associated low side external FET (e.g. Q1–Q3 in FIG. 1B) to turn on in a current limit event.

Overload conditions or excessive transient events may generate excessive heating, thermally stressing the IC. A programmable thermal shutdown circuit 224, with a sensor embedded in the same semiconductor substrate as the power IC, is configured to provide a fault flag when the IC temperature exceeds the programmed trip temperature.

Figure 3:
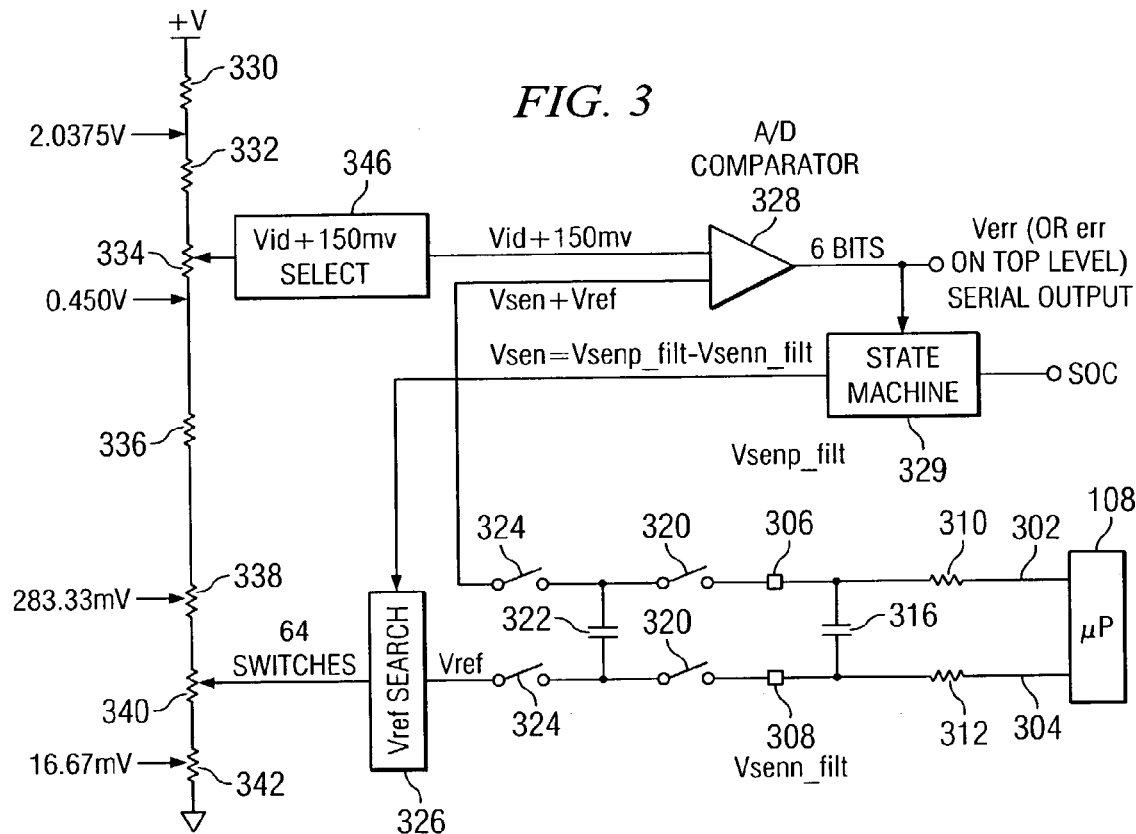
FIG. 3 is a schematic diagram illustrating a voltage analog to digital (A/D) converter in accordance with one aspect of the present invention.

Refer now to FIG. 3 for a description of an exemplary voltage A/D converter (218 in FIG. 2). This A/D converter is activated in the Regulation Mode Channel, as in the power IC 102 (FIG. 1). The voltages sensed by means of a Kelvin connection from microprocessor 108, i.e. high-level voltage VCC_Sense on line 302 and low level voltage VSS_Sense on line 304 are coupled to terminals 306 and 308 via filter resistors 310 and 312 and filter capacitor 316. Thus terminal 306 receives the filtered VSENP and terminal 308 receives the filtered VSENN voltage. When switch 320 is closed, this differential voltage is transferred to capacitor 322. After switch 320 is opened, switch 324 is closed transferring filtered VSENN to capacitor 322. While both switches 320 and 322 are open, capacitor 322 stores the differential voltage, i.e. filtered VSENP minus VSENN=VSEN. Vref Search block 326 provides an initial voltage Vref, e.g. 150 mvolts. Thus, when switches 324 are closed, the voltage provided to comparator 328 is the differentially sensed voltage plus Vref. Subsequently, after Vref Search block 326 selects the appropriate one of 64 voltages (which becomes Vref that can be different from 150 mvolts) and switches 324 are closed, a variable voltage equal to VSEN plus Vref continues to be inputted to Comparator 328. Comparator 328, then provides an error signal to State Machine 329. State Machine 329 provides a signal to the Vref search block 326 to indicate Whether Vref should be increased or decreased. In practice, a second pair of switches 320, 326, operated out of phase with the illustrated switches and connected to a second capacitor 322 enhances the operation.

With continued reference to FIG. 3, resistors 330, 332, 334, 336, 338, 340, and 342 are connected in series between a positive potential +V and ground. +V is an external reference voltage; which for the purposes of this example can be 2.5 volts. Assuming a total resistance in the resistor ladder of 20,000 ohms, 125 micro amps of current will flow and the voltage at the various points in the resistor ladder will be as shown. In this way, the select block will select Vid+150 mv. Vid is the desired voltage programmed by the user. This selection is based on a 7 bit word; which provides 128 choices. This provides a Vid selection from 300 mvolts to 1.875 volts in 12.5 mvolt steps. The selected Vid+150 mvolts is provided to comparator 328. Similarly, resistors 338, 340, and 342 provide a voltage difference from 16.67 mvolts to 283.33 mvolts in steps of 4.167 mvolts. A 6 bit reference search select provides 64 discrete choices, the least significant bit (LSB) being 4.167 mvolts. The selected reference voltage is provided as Vref by Vref search block 326 to be added to VSEN and inputted to A/D Comparator 328, as described hereinabove.

Referring now to FIG. 4, an exemplary embodiment of the current A/D converter (220 in FIG. 2) is illustrated. The Isense current which is a small mirrored fraction of the output current of the power IC (FIG. 2) is provided at node A, which is coupled to ground by resistor 402. When switch 406 is closed, the voltage is transferred to capacitor 408, which can have a value of 5 pf, for example. After switch 406 is opened switch 410 is closed, thereby providing the Isense current value to comparator 412. Resistors 414, 416, 418, 420, 422, 424, and 426 are connected in series between a positive potential +V and ground. +V is an external reference voltage, which for purposes of this example is 2.5 volts. Assuming a total resistance in the resistor ladder of 16,667 ohms, 150 micro amps will flow and the voltage at the various points in the resistor ladder will be as shown. Vref search block 428 will select one of 64 voltages with a 6 bit word. The range from which Vref is selected is 0 to 1.25 volts in 19.5 mvolts increments. Comparator 412 then provides a digital output IDIG representing the difference between Isense and Vref as the digitized peak current output to the control IC 100 and also to State Machine 430. In the present example, IDIG is a 7 bit word in which the first bit is a start bit. State Machine 430 feeds back a signal to Vref Search Block 428 to select a higher or lower Vref. A circuit useful for the functions of FIG. 4 is described in the above cross-referenced patent application to Goodfellow et al.

Figure 5:
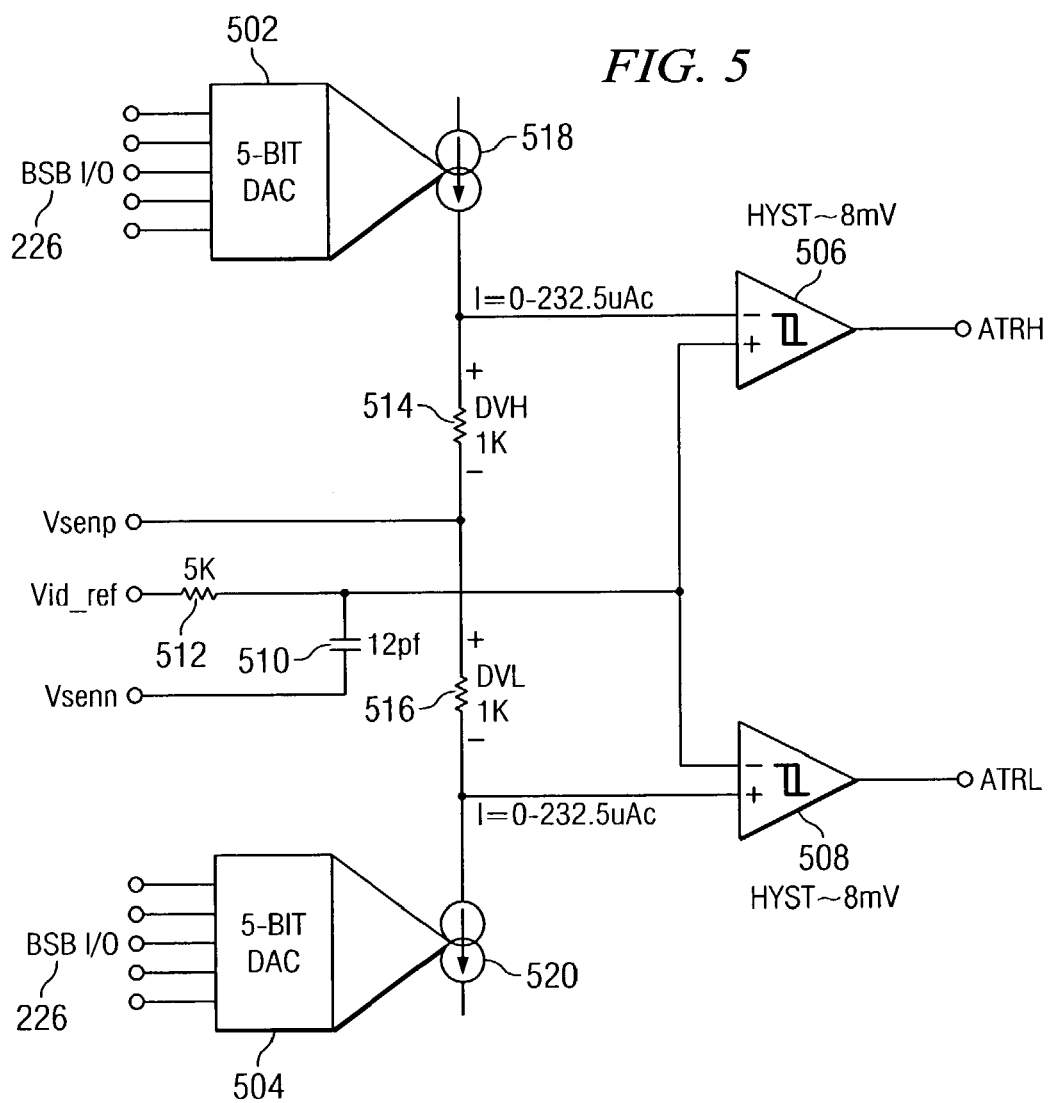
FIG. 5 is a schematic block diagram illustrating a window comparator in accordance with another aspect of the invention.
Figure 6:
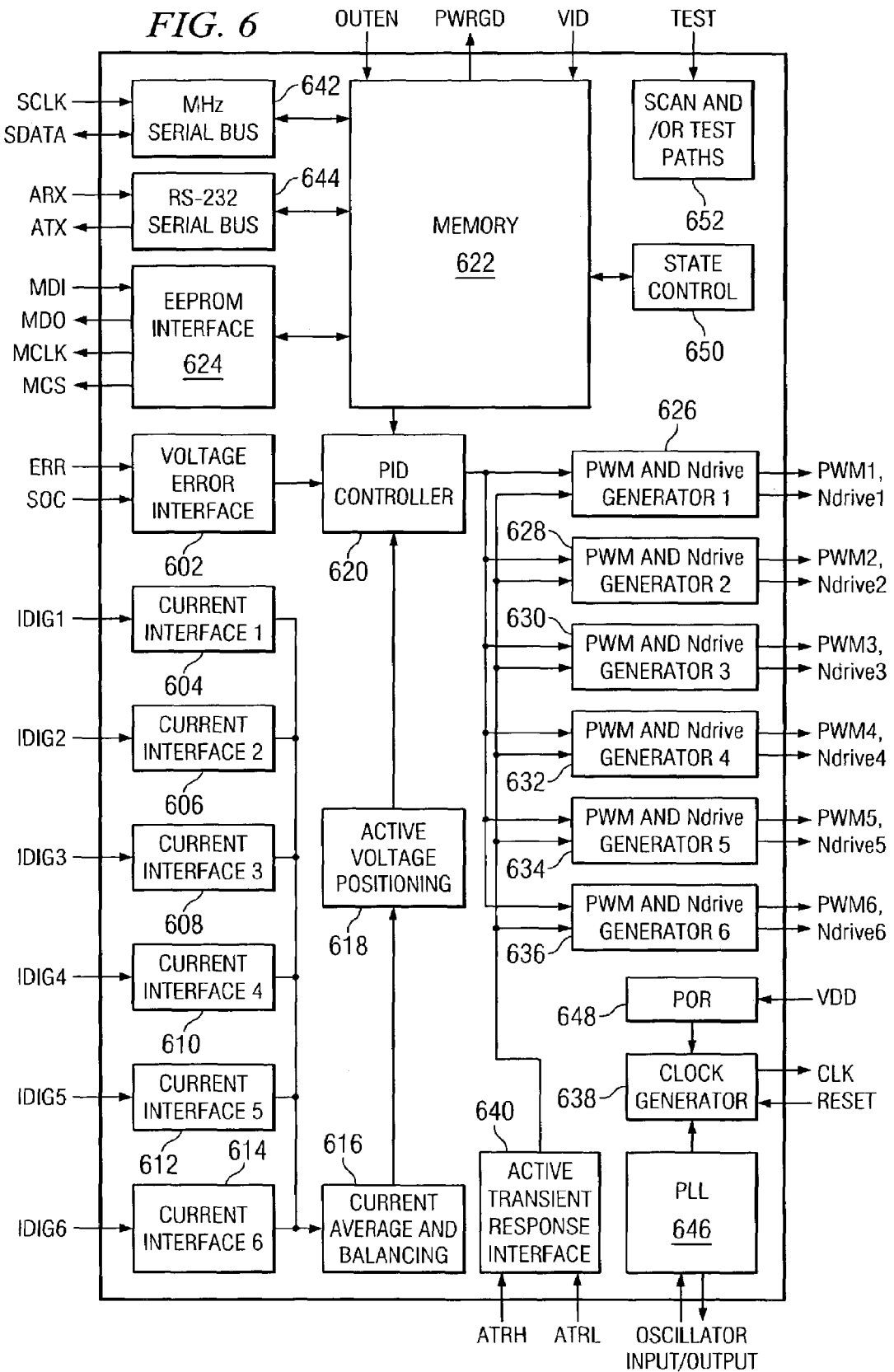
FIG. 6 is a schematic block diagram illustrating a window comparator in accordance with another aspect of the invention.

In the active transient response mode (the window comparator 216 has switch 217 in the position illustrated in FIG. 2), and the Active Transient Response Mode Channel (power IC 104 in FIG. 1) is implemented. Referring now to FIG. 5, an exemplary embodiment of the Window Comparator (216 in FIG. 2) is illustrated. The window comparator comprises 5 bit D/A converters 502 and 504 coupled to Comparators 506 and 508. Each of the D/A converters receives 5 parallel inputs from the backside serial bus interface (226 in FIG. 2). The window comparator receives additional inputs VSENP and VSENN from the microprocessor (108 in FIG. 1). Another input to the window comparator is Vidref, which is a charge pumped voltage that is then referenced to VSENN by means of capacitor 510 and resistor 512. In the illustrated example, the voltage across resistor 514 and the voltage across resistor 516 are programmable in a range from 0 Volts to 232.5 mvolt in 7.5 mvolt increments. The current sources 518 and 520 are programmed by the output of the D/A converters to desired current levels to achieve the desired voltages across the resistors. When VSENP deviates beyond a predetermined voltage point, one of comparators 506 or 508 is turned on. Comparator 506 provides an active response high (ATRH) and comparator 508 provides an active response low (ATRL) to the digital controller (control IC 100 in FIG. 1). In one case, this will cause the digital control IC 100 to send a signal turning on all of the high side FETs (208 in FIG. 2), for example, to maximize the power made available to the microprocessor (108 in FIG. 1). Alternatively, the digital control IC 100 will send a signal turning on all of the low side FETs, to minimize the power made available to the microprocessor. Referring now to FIG. 6, an exemplary embodiment of the control IC (100 in FIG. 1) is described. The control IC has a digital voltage error interface 602 that receives a serial digital error input ERR and a strobe input SOC that gates the error signal into voltage error interface 602. The voltage error interface 602 transforms the error signal from serial data into a 6 bit word. The error signal is received as 6 individual bits, most-significant bit (MSB) first and least significant bit (LSB) last. The strobe input goes logic "high" when the MSB is received, and remains "high" until the LSB is received. The strobe input (SOC) then goes logic "low" to demarcate the separation of consecutive error signals. The control IC also receives an IDIG input (IDIG1–IDIG6) from each of the six channels into independent digital current interfaces 604, 606, 608, 610, 612, and 614. This example describes six channels and six power ICs, although this aspect of the invention is scalable and a different number of channels can be provided. Similar to the digital voltage interface, the IDIG inputs are serial digital data, each consisting of 7 bits: a start bit and six data bits, where data is received from MSB to LSB. A start bit goes logic "high" prior to receiving a MSB. Within each current interface, the serial data is transformed into a 6 bit word. The current data represents the peak current delivered by each channel during the last switching period.

With continued reference to FIG. 6, the compensation network comprising blocks 616, 618 and 620 will now be described. The parallel digital voltage error and channel peak current data are delivered to the control IC's feedback path, which consists of three blocks for current averaging and balancing in block 616, active voltage positioning in block 618 and proportional integral derivative (PID) control 620.

The individual channel peak current data is summed and averaged in the current averaging balancing block 616. The difference between each channel's peak current and the calculated average peak is the amount of current imbalance present. This imbalance is corrected using current balancing by individually modulating the pulse width modulated PWM gate drive signal to each channel. Low current in a channel is corrected by slightly stretching that channel's PWM gate signal. Conversely, high current in a channel is corrected by slightly shrinking that channel's PWM gate signal.

The summed channel peak current is then delivered from block 616 to the active voltage positioning block 618. A current offset coefficient which is inputted from memory is used to transform the summed channel peak current into a total average current. For a given load current and VID level, a specific voltage error is calculated.

The control IC further comprises a digitally implemented enhanced proportional integral derivative feedback control PID 620. The calculated voltage error is delivered from block 618 to PID 620 where it is compared to the measured voltage error (from the voltage error interface 602). Pulse width modulation of all channels is preformed to correct any difference between the calculated and measured voltage errors. If the calculated voltage error is greater than the measured voltage error then the output voltage is too low. Conversely, if the calculated voltage error is less than the measured voltage error then the output voltage is too high. The PID feedback control 620 determines the rate of response of the PWM to rapid and gradual discrepancies in the measured voltage error.

The entire feedback path through blocks 616, 618, and 620 has fully programmable performance coefficients which are retained in a programmable storage device, i.e. on-chip memory block 622. Desired parameters such as user defined performance coefficients (and other configuration parameters) also may be stored in an optional external EEPROM 123 accessed through EEPROM interface 624. This digital programmability enables complete flexibility in the selection of VR power stage components, such as in power IC's 102, 104, and 106, and overall performance optimization.

The output of the feedback path is used to generate the individual channel PWM drive signals to the high side FET and Ndrive to the low side FET gate drive signals in PWM generators 626, 628, 630, 632, 634, and 636. In ordinary operation, these blocks serve two functions. First, they generate individual non-overlapping PWM and Ndrive digital gate drive signals. The non-overlap is a protection that prevents simultaneous activation of both the high side FET and the low side FET of a single channel. Second, they introduce a subscaling mechanism that enables very fine time resolution of the PWM digital gate drive signals. The control IC has a clock generator 638 that generates the clock signals used by all the blocks of the control IC. For a practical control IC, the smallest clock period measures nearly 10 nanoseconds. This coarse time step is inadequate for accurate pulse width modulation. Instead, the PWM generators implement a subscaling mechanism to divide a single clock period into many finer time steps with accuracy of less than one nanosecond (200 picoseconds being typical).

In a second mode of operation (the active transient response mode implemented with power IC 104), the gate drive signal outputs of the PWM generators are not derived from the feedback path, but instead are controlled by the active transient response (ATR) interface 640. The digital active response inputs, ATRL and ATRH, are commands from the power IC 104 to engage all the low side FETs or high side FETs, respectively. That is, the PWM digital outputs are identical to the ATRH digital inputs. Similarly, the Ndrive digital outputs are identical to the ATRL digital input. Three protection features affect this scheme. As a protection feature, the ATR interface 640 prevents simultaneous ATRL and ATRH reaction. As a second feature, the ATRH signal is monitored for duration. If ATRH remains high for an extended duration an unsafe high voltage could develop at the processor. Therefore, if ATRH remains high for an extended duration, the ATR interface 640 ignores the ATRH input. As a third protection feature, the number of ATRH and ATRL pulses received by the ATR interface 640 is monitored. If in a given time period too many pulses are received, the ATR interface 640 ignores both ATRH and ATRL inputs. This is done to guarantee that an active transient response mode will eventually terminate and return to the regulation mode of operation in which the feedback path alone determines the pulse width modulation. As with the feedback path, the ATR protection features are programmable via either the on chip memory block 622 or the optional external EEPROM 123 using the EEPROM interface 624.

All interfaces with the digital control IC 100 are digital. This digital interfacing has inherent noise immunity that permits the control IC to be located anywhere on a VR board. Communication between the control IC (100 in FIG. 1) and one or more power ICs (102, 104, and 106 in FIG. 1) is accomplished via a megahertz serial bus interface (MSI) 642. The digital control IC 100 fully configures the power ICs, as per user defined performance coefficients, using the MSI. These coefficients include cycle to cycle peak current limit, VID level, ATR thresholds, and maximum temperature limits. Communication between a system designer and the control IC 100 is performed via a conventional two wire asynchronous serial interface (RS 232 serial bus) 644. Using the asynchronous serial bus interface 644, a designer has direct access to the on chip memory, indirect access to the optional external EEPROM 123 (via EEPROM interface 624), and indirect access to one or more power IC's (via the MSI interface). Although all interfaces with the control IC 100 are digital, some of the circuit operations within the control IC 100 are not required to be digital and can be performed by analog circuitry.

When power is first supplied to the control IC 100, its operation must be coordinated with that of the one or more power IC's 102, 104, and 106. This is a two step process. In the first step, the internal clock must be generated and stabilized using a phase locked loop PLL 646. A reference oscillation is connected to the oscillator input. This input in turn is delivered to the PLL. Alternatively, a non self resonant reference may be connected to the oscillator input and output. The control IC includes a clock inverter that is used to sustain oscillations at the oscillator input. In the second step, any required supply voltage (VDD) must exceed a threshold voltage as determined by the power on reset (POR block 648). The control IC 100 may operate only when both conditions are satisfied. The threshold voltage of the control IC POR block 648 is higher that the threshold voltage of the power IC's POR block 202 to insure that the power IC's 102, 104, 106, etc. operate before the control IC 100.

When the control IC 100 becomes active, its operation is defined by a state control and fault monitor 650. It interfaces with the conventional VR input/output signals including VID, OUTEN, and PWRGD via memory 622. It also interfaces with the power ICs. Both interfaces are accomplished indirectly through the memory. Before the VR delivers a voltage to the microprocessor 108, the state control 650 causes the control IC 100 to configure the power IC's. While the VR delivers a voltage to the microprocessor 108, the state control 650 monitors the VR status. First, the state control 650 reads the VR control inputs (VID and OUTEN) and sets the VR control output PWRGD. It then controls the power IC VID level and PWM generators accordingly, i.e. the output voltage (to microprocessor 108) is dropped to zero if the OUTEN goes to logic "low", the power IC VID level is updated to match the VR VID inputs. Second, the state control 650 detects faults in the control IC 100 or in the power IC's 102, 104, 106, etc.. These include violations in average output current, input voltage, output voltage, temperature, and MSI communication. If any persistent fault is detected, the output voltage is dropped to zero and PWRGD is set to logic "low".

As previously noted, the operation of the state control 650 is programmable via either the on chip memory block 622 or the optional EEPROM 123. This programmability includes how to interpret the VR VID input, the selection of which faults to recognize, the number of power IC's present, how to configure the power IC's and whether to enable or disable the ATR mode. VID interpretation is generally defined by processor manufacturers (e.g. Intel, AMD and Motorola) such that a digital VID code represents a unique output voltage to be delivered to the microprocessor 108. When a VR is placed into a system, the system applies a VID code to the VR such that the VR delivers the specified output voltage. The control IC 100 has the flexibility to interpret both the Intel VR9 and VR10 standards as well as a completely programmable custom VID code. The custom VID coding, as well as the selection VR9, VR10, or custom interpretation are programmable in either the memory 622 or the optional external EEPROM 123.

Figure 7:
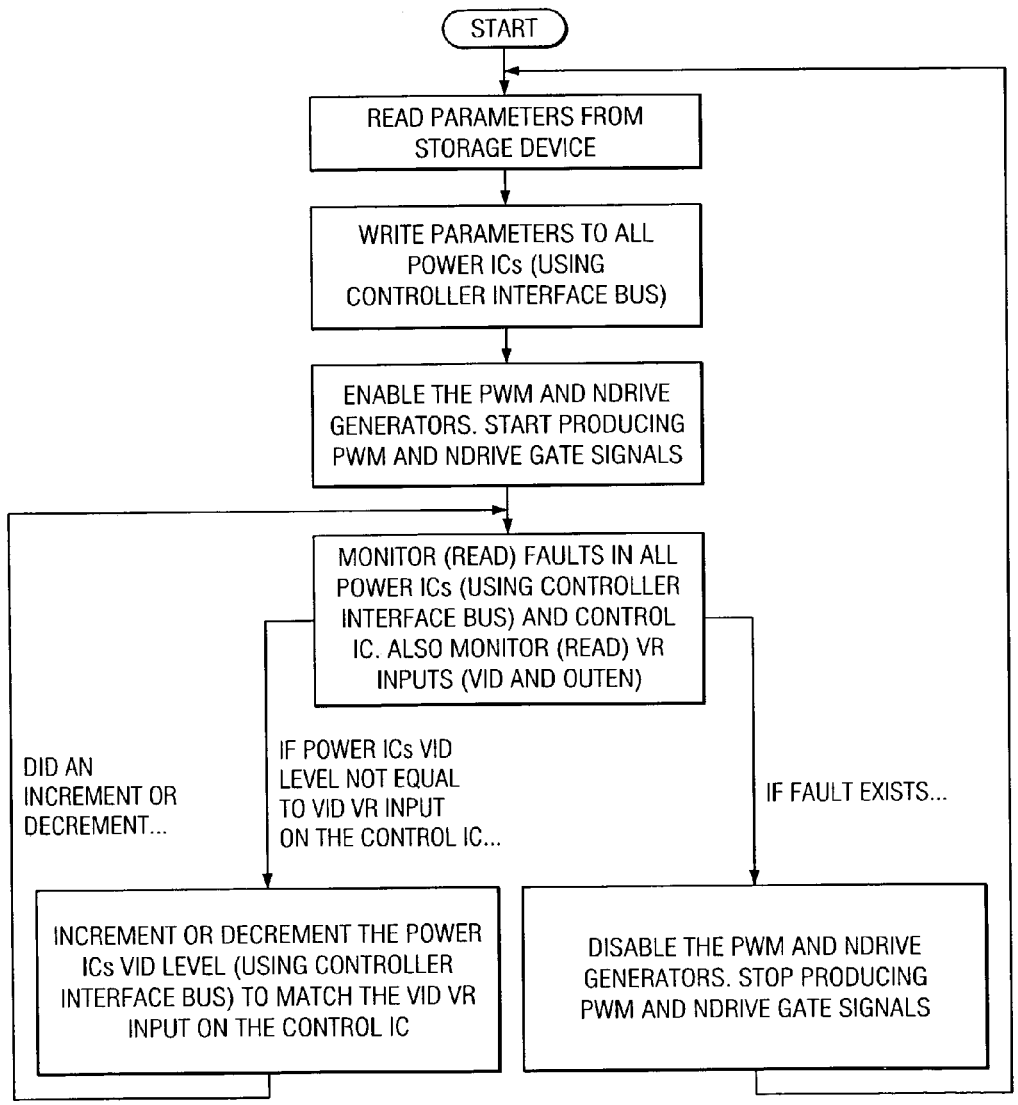
FIG. 7 is an exemplary embodiment of the state control flow diagram describing the operation of state control 650.

Refer now to FIG. 7, for an exemplary embodiment of the state control flow diagram describing the operation of state control 650 in FIG. 6. The state control 650 performs tasks of startup and initialization, fault monitoring and response, and monitoring of VR inputs (VID and OUTEN). The state control 650 also maintains a proper sequencing of these tasks. First, as step 1, parameters are read from the storage device (622 in FIG. 6). The parameters also may be supplied by the optional external EEPROM 123 using the EEPROM interface 624. These parameters are visible to all circuits within the digital control IC 100. Next, as step 2, the state control 650 causes the parameters to be written to all Power IC's using the Serial Bus 642. These parameters are stored within the power IC's in the I/O Command Interface/Failure Detect block (206 in FIG. 2) by the Backside Serial Bus Interface 226. These parameters include the settings for cycle-to-cycle peak current limit (as used by current limit block 212 to limit current supplied by high side switch 208), VID level (as used by 216 and 218), ATR thresholds and OV/UV thresholds (as used by 216 and 217), and maximum temperature limit (as used by 224). After all parameters have been distributed, as step 3, state control 650 enables the PWM and Ndrive Generators 626, 628, 630, 632, 634, and 636, such that the compensation network comprising blocks 616, 618, and 620 begins to regulate the power delivered to the load. As step 4, state control 650 then proceeds to a monitoring mode in which faults and VR input signals (VID and OUTEN) are observed. Fault conditions are read (using the Serial Bus 642) from the Power IC's where faults are stored in the I/O Command Interface/Failure Detect block 206. Faults include violations of average output current, input voltage, output voltage, temperature, errors in communication using the Serial Bus 642, and a logic "low" on the VR input OUTEN. This monitoring activity is the typical activity of the state control 650.

Two conditions cause state control 650 to suspend this monitoring activity. First, if the VID input at the digital control IC changes, or if the VID level stored within the Power IC's does not yet match the VID input at the Control IC, an incremented or decremented VID level is written to the Power IC's. After each increment or decrement, activity returns to monitoring. Second, if a fault condition is detected, state control 650 responds by disabling the PWM and Ndrive Generators such that the output voltage decays to zero volts. After a fault response, the state control 650 may be restarted.

For testability, the control IC also contains a scan path interface 652 that allows the internal registers of the control IC to be read and written. Gate connectivity and functionality can be determined with this approach. Those skilled in the art will recognize that this testability function can be implemented in hardware as a scan path, with boundary scan (JTAG), or with built in self test mechanisms (BIST).

When used with power IC's 102, 104, and 106, etc. the digital control IC (100 in FIG. 1) offers intelligent, digital, multi-phase control that provides high bandwidth, optimal control frequency response, noise immunity, and active transient response control algorithms. The design is fully scalable for controlling up to six phases, by using six power IC's.

Although the invention has been described herein in conjunction with the appended drawings, those skilled in the art will appreciate that the scope of the invention is not so limited. For example, many of the recited functions performed by illustrated hardware could be implemented with software. Various modifications in the selection, design, and arrangement of the various portions of the microelectronic components and the method of fabrication discussed herein may be made without departing from the scope of the invention as set forth in the appended claims.

What claimed is:

1. A digitally controlled voltage regulator comprising:
    a plurality of power integrated circuits adapted for coupling to a load having variable power requirements and for providing regulated power to said load, at least one of said plurality of power integrated circuits also sensing voltages at said load;
        wherein at least one of said power integrated circuits comprises a window comparator sensing voltage variations at said load and providing an output that initiates an active transient response to voltage variations sensed at said load, said window comparator comprising a first digital to analog converter providing a signal to a first comparator enabling it to provide a high active transient response signal and a second digital to analog converter providing a signal to a second comparator enabling it to provide a low active transient response signal;
    a control integrated circuit coupled to said plurality of power integrated circuits for providing digital control signals to said plurality of power integrated circuits and for receiving digital signals from said power integrated circuits;
    said control integrated circuit adjusting the digital control signals in response to the signals received from said power integrated circuits.

2. A digitally controlled voltage regulator as in claim 1, wherein said load having variable power requirements is a microprocessor.

3. A digitally controlled voltage regulator as in claim 1 wherein said control integrated circuit further comprises:
    a programmable storage device providing stored instructions, said control integrated circuit adjusting the digital control signals in response to the signals received from both said programmable storage device and said power integrated circuits.

4. A digitally controlled voltage regulator as in claim 3 wherein said programmable storage device comprises an electrically erasable programmable memory (EEPROM).

5. A digitally controlled voltage regulator as in claim 1, wherein said digital control signals are digital pulses of variable width providing pulse width modulated (PWM) digital control signals to control a high side power switch.

6. A digitally controlled voltage regulator as in claim 5, wherein said digital control signals also provide signals to control a low side power switch.

7. A digitally controlled voltage regulator as in claim 1, wherein said window comparator comprises a circuit for sensing over voltage and under voltage conditions.

8. A digitally controlled voltage regulator as in claim 1, wherein at least one of said power integrated circuits comprises a temperature sensing device.

9. A digitally controlled voltage regulator as in claim 8, wherein said temperature sensing device is formed on the same semiconductor substrate as the power integrated circuit.

10. A digitally controlled voltage regulator as in claim 1, wherein at least one of said plurality of power integrated circuits comprises:
    a voltage analog to digital converter circuit for sensing the voltages at said load;
    said voltage analog to digital converter circuit providing a digital error signal to said control integrated circuit in response to the voltages sensed at said load and a reference voltage.

11. A digitally controlled voltage regulator as in claim 10, wherein said digital error signal is the difference between a programmable reference voltage and a regulated output voltage.

12. A digitally controlled voltage regulator as in claim 1, wherein at least one of said power integrated senses the voltage directly at the load by means of a Kelvin connection to the load.

13. A digitally controlled voltage regulator as in claim 1, wherein all of said power integrated circuits comprise:
    a high side power switch; and
    a driver circuit responsive to digital control signals from said control integrated circuit to selectively turn said power switch on and off.

14. A digitally controlled voltage regulator as in claim 13, further comprising:
    a low side power switch; and
    a driver circuit responsive to digital control signals from said control integrated circuit to selectively turn said power switch on and off.

15. A digitally controlled voltage regulator as in claim 13, wherein each of said plurality of power integrated circuits provides a different phase of power to said load.

16. A digitally controlled voltage regulator as in claim 13, further comprising:
    a current mirror circuit for generating a current that is a ratio of the current delivered to the load; and
    a current analog to digital converter for providing the digital value of the fractional peak current to said control integrated circuit.

17. A digitally controlled voltage regulator as in claim 16, wherein said current mirror circuit is formed on the same semiconductor substrate and by the same process as said high side switch assuring accurate scaling with automatic process and temperature variation compensation.

18. A digitally controlled voltage regulator as in claim 16, said current analog to digital converter comprises:
   a capacitor for storing the peak current provided by the current mirror; and
   a comparator for comparing the peak current with a reference and providing as its output a serial digital output IDIG.

19. A digitally controlled voltage regulator as in claim 1, wherein one of said power converters comprises:
   a voltage analog to digital converter for sensing voltages at said load, comparing said voltages with a reference voltage and providing a digitized error signal to said control integrated circuit.

20. A digitally controlled voltage regulator as in claim 19, wherein said voltage analog to digital converter comprises:
   a capacitor for storing the sensed load voltage; and
   a comparator for comparing the sensed load voltage to a reference voltage and providing as its output a serial digital output error signal.

21. A digital control integrated circuit comprising:
   a digital current interface for receiving digital information representing current measurements;
   a voltage error interface for receiving a voltage error signal;
   a programmable storage device for storing desired parameters;
   a compensation network responsive to digital signals from each of said digital interfaces and said voltage error interface and instruction storage device, said compensation network comprising a circuit for current averaging and balancing responsive to signals from said digital current interface, an active voltage positioning circuit responsive to the output of said circuit for current averaging and balancing and a proportional integrated derivative feedback control circuit (PID) for receiving inputs from the active voltage positioning circuit and the instruction storage device, for providing signals to said pulse width modulator; and
   said pulse width modulator responsive to signals from said compensation network for providing signals of varying pulse width to thereby control the power to a load device.

22. A digital control integrated circuit as in claim 21, further comprising:
   an active transient response interface for providing signals to said pulse width modulator, said signals from said transient response interface overriding signals from said compensation network for controlling the width of pulses controlling the power to a load device.

23. A digital control integrated circuit as in claim 22, further comprising:
   a state control for receiving parameters from said storage device and enabling said pulse width modulator to start producing pulse width modulated gate signals,
   said state control monitoring fault signals and disabling the pulse width modulator if a fault is detected.

* * * * *